E. TYDEN.
SEAL LOCKING DEVICE.
APPLICATION FILED FEB. 26, 1915.
1,155,768.
Patented Oct. 5, 1915.
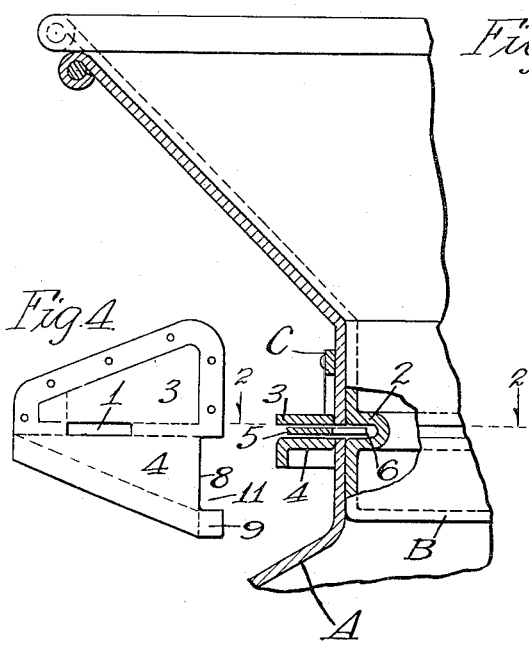
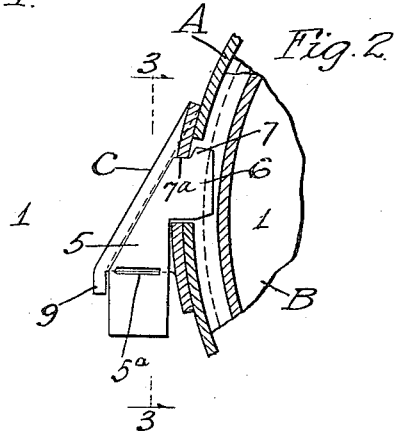
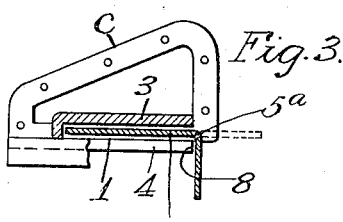
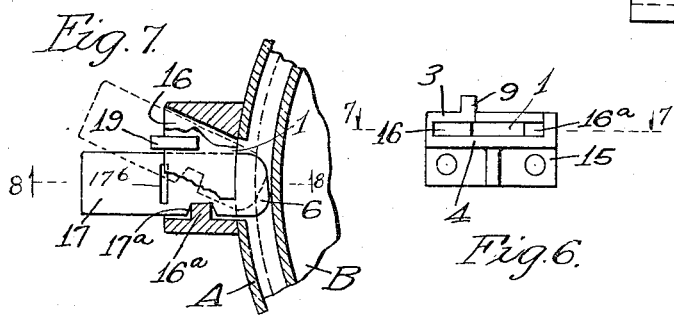
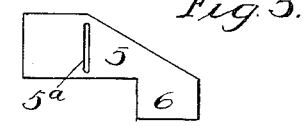
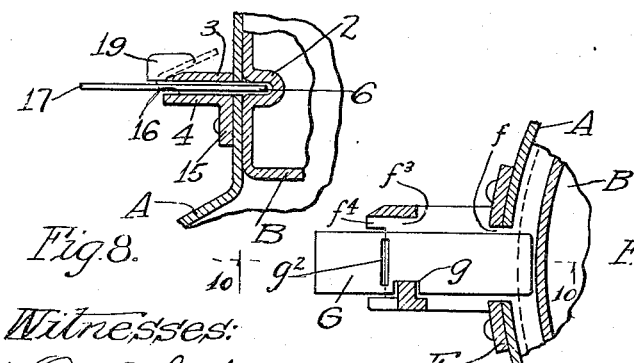
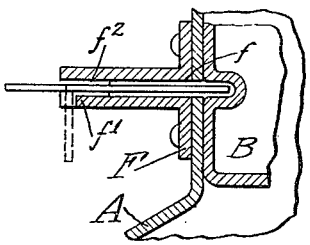
Witnesses:
Inventor:
Emil Tyden
by Burton & Burton
his Attys.

UNITED STATES PATENT OFFICE.

EMIL TYDEN, OF EVANSTON, ILLINOIS.

SEAL-LOCKING DEVICE.

1,155,768.   Specification of Letters Patent.   Patented Oct. 5, 1915.

Application filed February 26, 1915. Serial No. 10,813.

*To all whom it may concern:*

Be it known that I, EMIL TYDEN, a citizen of the United States, and resident of Evanston, in the county of Cook and State of Illinois, have invented new and useful Improvements in Seal-Locking Devices, of which the following is a specification, reference being had to the accompanying drawings, forming a part thereof.

The purpose of this invention is to provide an improved seal locking device particularly adapted for cans or other structures having telescoping or otherwise interlapping or overlapping members which are connected by such device.

It consists in the elements and features of construction shown and described, as indicated in the claims.

In the drawings: Figure 1 is a radial section of a portion of the can having a telescoping cover, equipped with locking device embodying this invention. Fig. 2 is a section at the line 2—2 on Fig. 1, showing the seal bolt in locking position before it is folded into sealed position. Fig. 3 is a section at the line 3—3 on Fig. 2, showing the seal bolt in locked and sealed position in full line, and in locked and unsealed position in dotted line. Fig. 4 is a plan view of a blank from which the seal mount is formed by cutting and folding. Fig. 5 is a plan view of a slightly modified form of a seal bolt. Fig. 6 is a front elevation of the mount of a modified form. Fig. 7 is a view similar to Fig. 2 as at the line 7—7 on Fig. 6. Fig. 8 is a section at the line 8—8 on Fig. 7, showing the seal in dotted line folded for sealing. Fig. 9 is a view similar to Fig. 2, showing a further modification. Fig. 10 is a section at the line 10—10 on Fig. 9.

In the drawings A represents the body of the can and B the cover, and these two elements stand for any interlapped, overlapped or telescoped members of the device which is to be secured by this seal lock. Upon the outer side of the can body, A, there is secured the mount or housing C of the seal bolt. This mount is preferably formed, as shown, of sheet metal folded up from a single blank so as to be adapted to be riveted onto the outer side of the can body, having an aperture, 1, which registers with an aperture in the seal mount through which the seal bolt is inserted to engage the shoulder, 2, on the cover, to prevent the withdrawal of the latter while the seal bolt is in position. The mount, C, is folded to form two parallel flanges, 3, and 4, which constitute guides leading to the aperture, 1, in which a flat seal bolt, 5, may be inserted for entering its engaging end projection, 6, through the aperture, 1, for engagement with the shoulder, 2, of the cover. Preferably the terminal, 6, of the bolt is in hook form, that is, having a projection, 7, making an angle with the edge, 7$^a$, from which it projects, and adapted to engage inside of the mount, that is, with the inner surface of the margin of the aperture, 1, (or with the sheet metal of the can when that is lapped close to the aperture). At its base or junction with the body of the seal bolt the projection, 6, is of the full width of the aperture, 1, so that when engaged therein the seal bolt cannot slide longitudinally. Preferably the seal bolt is shaped as to its inner edge so as to conform substantially to the shape, which in the present instance is curved,—of the outer surface of the can body, and fit thereagainst, or against the web of the mount, when the projection, 6, is inserted through the aperture, 1, into locking position of the seal bolt; and the edge, 8, of the flange, 4, remote from the aperture, 1, extending transversely with respect to the edge of the seal bolt which crosses it when the seal bolt is in locking position, constitutes a support over which the seal bolt is folded, as hereinafter described, to seal it. At the outer end of this edge, 8, the flange, 4, is formed so as to provide a shoulder, 9, projecting off from said edge 8 transversely thereto, that is, substantially in the direction of the outer edge of the seal bolt before the latter is folded, so that when it is folded over the edge, 8, the portion thus folded extends crosswise of or past the shoulder preventing the edgewise displacement of the seal bolt and thus preventing the withdrawal of the seal bolt unless and until the folded portion is straightened back into its original plane. The seal bolt is weakened at the line at which it is to be folded over the edge, 8, as described, as for example, by cutting an aperture, 5$^a$, at that line, both for the purpose of insuring its folding accurately at the proper line, and also so that when it is straightened back, or attempted to be straightened back into its original plane it will break and thus tampering with the seal will be manifest.

It will be observed that in the form of this device shown in Fig. 2 in which the engaging end of the seal bolt is hooked by being provided with the projection, 7, the seal bolt is entered into locking position by an edgewise swinging movement in which the hooked end becomes engaged inside the margin of the aperture, 1, of the mount; and it will be noticed that an essential characteristic of the device is that in this entering movement the seal is stopped against the mount, the stop being the web of the mount itself against which the inner longitudinal edge of the seal bolt is positioned at locking position, or the end of the aperture through the mount against which the rear edge of the projection, 6, becomes stopped at the limit of the edgewise swinging movement mentioned; and that there is provided a second stop past which the end portion of the seal bolt is folded in the sealing operation, and which stop, namely the projection forming the shoulder, 9, prevents the seal bolt from being swung away from the first mentioned stop, so long as the seal bolt remains folded as described across that shoulder. Preferably the shoulder in question is produced by forming in the blank from which the mount is made a recess, 11, wide enough to accommodate the width of the seal bolt, and folding the marginal portion of the blank at right angles to the flange, 4, forming a stiffening flange thereon whose end portion projecting as described, constitutes the shoulder as well with or without the folding of said flange as described.

In Fig. 5 there is shown a form of the seal bolt which is without the projection, 7. In this form the seal bolt is designed to be entered by a direct movement between the flanges, 3 and 4, for thrusting the projection, 6, without swinging, or at least without any need of swinging it, through the aperture, 1. When made in this form the seal is just as secure against disengagement so long as the end remains folded past the shoulder, 9, as described, as in the other form because the projection, 6, cannot be withdrawn from the aperture, 1, except by swinging the whole device about the point of engagement of contact of the folded end with the shoulder, 9, and this point being situated so that a line drawn from it to the point of engagement of the projection, 6, with the farther end of the aperture, 1, makes an obtuse angle with the end edge of said projection, such swinging movement to disengage the projection from the aperture could not be made without elongating the aperture as much as the excess of the distance from said pivotal point of the seal bolt against the shoulder, 9, to the extreme forward corner of projection, 6, over the distance from said pivotal point to the outer end corner of the seal.

The characteristic of the seal bolt which is essential to its operation in the manner designed, is what may be called a "hook formation," by which is meant substantially a form which requires for the engagement that the bolt be moved in two directions so as to pass some element with which it is to be engaged and also be moved in a direction transverse to that which is necessary for passing the engaged feature in order to come into engagement therewith. The two movements being performed simultaneously results in the swinging movement described which is necessarily employed for engaging the hook bolt when it is in the form shown in Fig. 2, and when the mount or housing is in the form shown in that figure and Fig. 1. This movement may be more broadly described as an edgewise movement in two directions; and the "hook formation" may be varied very greatly, suitable corresponding changes being made in the housing, and any form which involves either a projection from or recess in the edge of the seal bolt necessitating the movement in two directions in order that the recess or the projection may pass by and also come in behind or in engagement with a coöperating projection or recess whether the recess or projection is at or near one end or elsewhere in the length of the seal bolt, will involve the essential feature which is defined by the term "hook formation". A wide variety of modifications of the device may be designed embodying this feature of hook formation with edgewise movement in two directions, in combination with the two other important features, namely a stop to limit the engaging movement, and a stop which may be engaged with the folded over end of the seal to prevent an outward disengaging movement. Figs. 6 and 7 show one of these modifications. In this form the housing or mount, 15, has a flat pathway 16 for the entrance of the flat seal which tapers narrowing from its outer end to its inner reduced end which forms the aperture through which the end of the seal is thrust for locking and from one edged wall of the tapered throat-way or path, a projection, 16ª, extends into said path in position to engage with the notch, 17ª, in one edge of the seal bolt, 17, which is substantially a straight parallel-sided strip except that the end which protrudes through the aperture for locking engagement is tapered by rounding both corners as shown. The distance from the end of the projection, 16ª, directly to the opposite oblique side of the throat-way or seal bolt path, is substantially equal to the width of the seal bolt, so that the latter being inserted along the said oblique edge or side of the throat will pass the projection in entering the end through the aperture into locking position, and the seal bolt being then swung edgewise over toward the other edge of the throat will engage its notch, 17ª, with the projection, 16ª, and come to rest in locked position stopped against the last mentioned edge wall of the throat or seal path. The housing or mount has a projection which may extend from either of the parallel walls of the throat or seal pathway at the outer end thereof, and in position such that the seal bolt moves past it in swinging from the oblique position at which it is entered to the direct position at which it is engaged with the projection, 16ª. The seal is weakened at a transverse line coinciding with the outer edge or corner of the wall having the projection, 19, so as to hold it over said edge, the folded portion being in folding action swung past the projection so that it will extend across the same; and for further security it may be folded back under the said wall as shown in Fig. 8. It will be seen that when the seal bolt has been inserted and folded as described, it cannot be withdrawn until it is straightened out again into its original form, and this construction is such that by reason of the weakening of the seal bolt at the folding line, such straightening will break it off at that line.

In Figs. 9 and 10 there is shown another modification in which the movement of the seal bolt to reach locked position is in two directions without being what might be properly termed a swinging movement; the two movements being on the contrary successive, the first being an inward thrust, and the second a lateral edgewise movement for engagement. In this form the mount, F, has the aperture, $f$, through which the end of the seal bolt is inserted for locking and situated at a little distance off from the web which has this aperture, $f$, there is a second web, $f^2$, which has an aperture, $f^3$, through which the seal bolt is thrust endwise, this aperture being, however, not directly opposite the aperture, $f$, but offset in the direction of the length of the aperture, a distance about equal to the depth of the notch, $g$, which is formed into one lateral edge of the seal bolt, G. Both the apertures, $f$ and $f^3$, are long enough to accommodate the width of the seal bolt loosely so that said seal bolt being inserted through the aperture, $f^3$, in a slightly inclined direction can also have its end inserted through the aperture, $f$, and thrust therethrough far enough for its locking function to bring the notch, $g$, into position for engaging with the margin of the aperture, $f^3$, such engagement being effected by lateral edgewise movement of the seal bolt. From the outer side of the second web, $f^2$, there is a projection, $f^4$, adjacent to the aperture, $f^3$, and lapping by that aperture at the opposite side thereof from that at which the aperture margin is engaged with the notch, $g$, a distance about equal to the depth of said notch, and of such engagement. When the seal bolt has been inserted as described and its notch, $g$, has been engaged as described, it is folded over the lateral edge of the aperture, $f^1$, at a line which is weakened by an aperture, $g^2$, in the seal, so as to cause the folded portion to extend crosswise of the projection, $f^4$, and thus prevent the seal bolt from being moved edgewise to disengage its notch, $g$, from the margin of the aperture, $f^3$, and since without such disengagement the seal bolt cannot be withdrawn endwise, the disengagement of its inner locking end from the part which is locked thereby is prevented, so long as the end portion of the seal remains folded as described; and the construction is as in the other forms of seals such that upon being straightened back into its original form the seal will break at the weakened and folded line.

I claim:—

1. A seal bolt having a hooked end adapting it to be engaged by an edgewise swinging movement about the corner of that which the hook engages, in combination with a mount for the same having an aperture into which the seal bolt is thrust for locking, and having a stop to limit the swinging movement of the seal bolt at locking position of the latter, and a second stop past which the seal bolt swings to reach said position, the seal bolt being weakened for folding to extend its outer portion adjacent to the last mentioned stop; whereby it is stopped from swinging back from locked position; the seal being adapted to break at said weakened line upon being straightened back past the second stop.

2. A flat seal bolt having a hook formation and adapted to be engaged by edgewise movement in two directions, in combination with a mount for the same which the hook is adapted to engage, and having an aperture through which the seal bolt is thrust for locking, said mount having an exterior abutment adjacent to the path of engaging movement of the seal bolt, the latter being weakened for folding at a line positioned for causing it when folded to extend one edge past said abutment, and adapted to break at the weakened line upon being straightened back past the abutment.

3. A flat seal bolt having a hook formation and adapted to be engaged in movement in two directions; a mount for the same having an aperture through which the seal bolt is thrust for locking and with which the hook is adapted to engage upon having received said two movements, said mount having an exterior abutment adjacent to the path of the seal bolt in the concluding portion of said engaging movement, the seal bolt being weakened for folding at a line positioned for causing it in such folding to extend past said abutment, and adapted to break at the weakened line upon being straightened by swinging back past the abutment.

4. A flat seal bolt having at one end a projection for its locking engagement; a mount for the same having an aperture through which said projection is thrust for said locking engagement; said mount being formed of sheet metal folded to form two parallel flanges projecting from the opposite sides of the aperture and forming a path for the seal bolt edgewise therethrough, one of said flanges having a shoulder adjacent to the entering path of the outer edge of the seal bolt, the latter being weakened for folding at a transverse line positioned to cause its outer portion when so folded to extend past said shoulder.

5. A flat seal bolt having a projection extending from one edge, in combination with a mount for the same having an aperture for engagement of the projection, and a path for the edgewise entrance of the seal bolt leading from the projection to the aperture, and having a guard at both sides, one of the guards having at the end thereof removed from the aperture a shoulder past which the outer lateral edge of the seal bolt passes in said edgewise entrance; the seal bolt being weakened for folding at a line positioned to cause the folded portion of the seal bolt to extend inside said shoulder.

In testimony whereof witness my hand at Chicago, Illinois, this 8th day of February, 1915.

EMIL TYDEN.

Witnesses:
EDNA M. MACINTOSH,
LUCY I. STONE.

Copies of this patent may be obtained for five cents each, by addressing the "Commissioner of Patents, Washington, D. C."